United States Patent
Choi et al.

(10) Patent No.: US 10,329,438 B2
(45) Date of Patent: *Jun. 25, 2019

(54) SILICA SOL COMPOSITION WITH EXCELLENT DISPERSIBILITY TO CYANATE RESIN, AND PREPARATION METHOD THEREFOR

(71) Applicant: LG CHEM, LTD., Seoul (KR)

(72) Inventors: Hee-Jung Choi, Daejeon (KR); Hyung-Kee Kim, Daejeon (KR); Seong-Kyun Kang, Daejeon (KR); Hyeon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 140 days.

This patent is subject to a terminal disclaimer.

(21) Appl. No.: 15/311,720

(22) PCT Filed: May 29, 2015

(86) PCT No.: PCT/KR2015/005394
§ 371 (c)(1),
(2) Date: Nov. 16, 2016

(87) PCT Pub. No.: WO2015/183031
PCT Pub. Date: Dec. 3, 2015

(65) Prior Publication Data
US 2017/0088721 A1 Mar. 30, 2017

(30) Foreign Application Priority Data
May 30, 2014 (KR) .................. 10-2014-0066022
May 28, 2015 (KR) .................. 10-2015-0074617

(51) Int. Cl.
| | |
|---|---|
| C08K 9/06 | (2006.01) |
| C09D 7/62 | (2018.01) |
| C09D 7/45 | (2018.01) |
| C09D 7/63 | (2018.01) |
| C09D 7/20 | (2018.01) |
| C09D 7/40 | (2018.01) |
| C01B 33/14 | (2006.01) |
| C09D 179/04 | (2006.01) |
| C09D 161/14 | (2006.01) |
| C08K 3/36 | (2006.01) |
| C08K 5/5435 | (2006.01) |

(52) U.S. Cl.
CPC ............... C09D 7/62 (2018.01); C01B 33/14 (2013.01); C09D 7/20 (2018.01); C09D 7/45 (2018.01); C09D 7/63 (2018.01); C09D 7/68 (2018.01); C09D 161/14 (2013.01); C09D 179/04 (2013.01); C08K 3/36 (2013.01); C08K 5/5435 (2013.01); C08K 9/06 (2013.01); C08K 2201/003 (2013.01)

(58) Field of Classification Search
CPC .......... C08K 9/06; C09C 1/3081; C09D 7/62; C09D 7/63; C09D 7/68
See application file for complete search history.

(56) References Cited

U.S. PATENT DOCUMENTS

| | | |
|---|---|---|
| 2005/0170188 A1 | 8/2005 | Campbell et al. |
| 2009/0130306 A1 | 5/2009 | Yoo et al. |
| 2009/0143490 A1* | 6/2009 | Masuda ................ C01B 33/148 516/34 |
| 2014/0000152 A1 | 1/2014 | Toerncrona et al. |

FOREIGN PATENT DOCUMENTS

| | | |
|---|---|---|
| CN | 101495409 A | 7/2009 |
| JP | 02-117976 * | 5/1990 |
| JP | 2005-298226 A | 10/2005 |
| JP | 2009010899 A | 1/2009 |
| JP | 4276423 B2 | 6/2009 |
| JP | 2009-155138 A | 7/2009 |
| JP | 2009-227510 A | 10/2009 |
| JP | 2010-195604 A | 9/2010 |
| JP | 2012-214339 A | 11/2012 |
| JP | 2013-010899 A | 1/2013 |
| JP | 2013-504512 A | 2/2013 |
| KR | 10-2009-0050237 A | 5/2009 |
| KR | 10-2009-0090324 A | 8/2009 |
| KR | 10-2011-0128933 A | 11/2011 |
| KR | 10-2014-0010955 A | 1/2014 |
| WO | 2008-015943 A1 | 2/2008 |

OTHER PUBLICATIONS

English language translation of JP 02-117976, May 1990.*
English language abstract JP 02-117976, May 1990.*
International Search Report and Written Opinion issued for International Application No. PCT/KR2015/005394 dated Aug. 3, 2015, 8 pages.

* cited by examiner

*Primary Examiner* — Margaret G Moore
(74) *Attorney, Agent, or Firm* — Rothwell, Figg, Ernst & Manbeck, P.C.

(57) ABSTRACT

Disclosed are a silica sol composition including silica, an anionic dispersant, two or more epoxy silane coupling agents, and an organic solvent, and a method for preparing the same. In the silica sol composition, a uniform surface modification of silica particles may be achieved by using an anionic dispersant and two or more epoxy silane coupling agents, and it is possible to effectively enhance the compatibility between a silica filler whose surface is modified with an epoxy group and a resin which is an underfill composition.

20 Claims, 2 Drawing Sheets

SILICA SOL COMPOSITION WITH EXCELLENT DISPERSIBILITY TO CYANATE RESIN, AND PREPARATION METHOD THEREFOR

CROSS-REFERENCE TO RELATED APPLICATIONS

This application is a 35 U.S.C. § 371 National Phase Entry Application from PCT/KR2015/005394, filed on May 29, 2015, and designating the United States, which claims priority under 35 U.S.C. § 119 to Korean Patent Application No. 10-2014-0066022, filed on May 30, 2014; and Korean Patent Application No. 10-2015-0074617, filed on May 28, 2015, the entire disclosure of which is incorporated herein by reference.

TECHNICAL FIELD

The present invention relates to a silica sol composition having excellent dispersibility in a cyanate resin and a method for preparing the same. More particularly, the present invention relates to a silica sol composition having excellent dispersibility in a hydrophobic resin by adding an anionic dispersant and two or more epoxy silane coupling agents to the silica sol composition to modify the surface of silica, and a method for preparing the same.

BACKGROUND ART

In an integrated circuit, easily flexible thin substrates are used. As many materials such as metals, dielectric materials, and composites are used in the substrate, warpage occurs due to the difference in values of the coefficients of thermal expansion (CTE) of respective materials. The warpage imposes pressure on parts of an electric assembly, thereby producing problems. In order to prevent the warpage, a silica filler having a low coefficient of thermal expansion (CTE) is used as an underfill composition. A large amount of silica is introduced into the substrate in order to reduce the CTE, a silica additive for a circuit material is generally used by removing residual silanol groups on the surface of silica and being surface-treated with epoxy silane which is resin curable, and the quality of the circuit substrate may be improved by removing silanol groups on the surface of the silica filler through silica surface modification. The silica whose surface is modified with the epoxy group is cured with a compounded resin which is an underfill composition to improve mechanical properties of the substrate. Before the underfill composition is cured, a fully-blended varnish, which is a mixed solution, is prepared by dispersing a silica filler in a polar organic solvent, and then mixing the resulting dispersion with a compounded resin exhibiting hydrophobicity. Various resins, pigments, and curing agents are included in the compounded resin. It is judged that among resins used in the preparation of varnish, a cyanate resin causes the biggest problem in compatibility due to the difference in polarity with a silica filler, and when residual silanol groups are not sufficiently blocked because the surface treatment of the silica filler is not uniform, or the compatibility between an epoxy group which is a silica surface treatment agent and a cyanate resin is low, the viscosity of varnish which is a mixed solution is significantly increased to reduce the process efficiency prior to the curing of the composition, and problems are caused to the process of producing a stable product.

As an invention in the related art, in Korean Patent Application Laid-Open No. 10-2009-0090324, Japanese Patent No. 4276423, and the like, studies have been conducted on s silica filler for a circuit material by blocking silanol groups on the surface of the silica filler, but residual silanol groups on the surface of the silica filler are not sufficiently blocked by the related art, or even though residual silanol groups on the surface are blocked, the compatibility between a functional group which blocks silanol groups on the surface of the filler and a compounded resin is problematic, and as a result, there still remains a problem in that the viscosity of the composition is significantly increased.

DISCLOSURE

Technical Problem

Therefore, the present invention has been made keeping in mind the above problems encountered in the related art, and an object of the present invention is to provide a silica sol composition for a circuit material, which may uniformly modify the surface of silica and may enhance the compatibility with a cyanate resin in order to solve a problem in that when residual silanol groups are not sufficiently blocked because the surface treatment of a silica filler is not uniform, or the compatibility between an epoxy group which is a silica surface treatment agent and the cyanate resin is low, the viscosity of a fully-blended varnish which is a mixed solution is significantly increased to reduce the process efficiency prior to the curing of an underfill composition, and a method for preparing the same.

Technical Solution

In order to accomplish the above object, the present invention provides a silica sol composition including silica, an anionic dispersant, two or more epoxy silane coupling agents, and an organic solvent.

Further, the present invention provides a method for preparing a surface-modified silica sol composition, the method comprising: (a) dissolving an anionic dispersant in an organic solvent, and then adding silica thereto to prepare a silica dispersion; (b) adding a first epoxy silane coupling agent to the silica dispersion to which the anionic dispersant is added to modify a surface thereof; and (c) further introducing a second epoxy silane coupling agent into the surface-modified silica dispersion in Step (b) to modify a surface of silica.

In addition, the present invention provides a varnish composition including the silica sol composition and a cyanate resin.

Advantageous Effects

According to the method for preparing a surface-modified silica sol composition of the present invention, there are advantages in that a uniform surface modification of silica particles may be achieved by using an anionic dispersant and two or more epoxy silane coupling agents, and it is possible to effectively enhance the compatibility between a silica filler whose surface is modified with an epoxy group and a compounded resin which is an underfill composition.

BEST MODE

Figure 1:
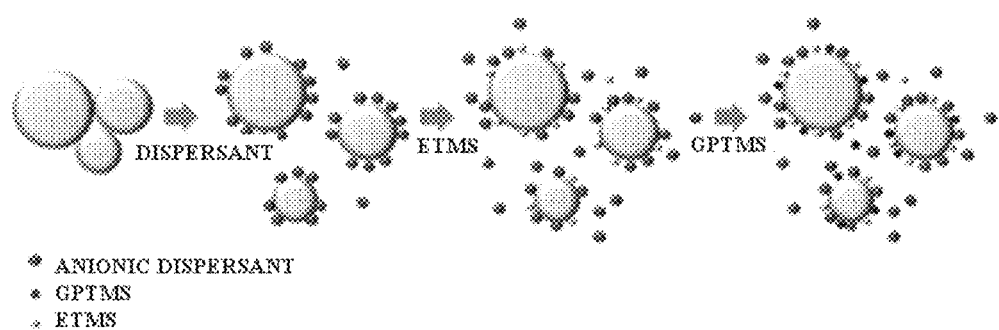
FIG. 1 is a picture illustrating a schematic view of a method for preparing a surface-modified silica sol composition of the present invention.

Hereinafter, a silica sol composition having excellent dispersibility in a cyanate resin and a method for preparing the same according to the present invention will be described in detail.

The silica sol composition of the present invention has excellent dispersibility in a cyanate resin, and includes silica, an anionic dispersant, two or more epoxy silane coupling agents, and an organic solvent for the excellent dispersibility. In particular, the anionic dispersant includes a silica filler in the present invention in order to improve the dispersibility by enhancing the compatibility with a polar organic solvent, and at least one of the two or more epoxy silane coupling agents includes a silica filler in the present invention in order to improve the dispersibility in a hydrophobic resin, and at least the other includes a silica filler in the present invention in order to improve the dispersibility in a silica slurry.

In the silica sol composition of the present invention, the silica means $SiO_2$, and a silica generally used in the art may be used without particular limitation. The silica is in the form of powder, and in this case, silicon atoms and an oxygen atom form a siloxane bond (Si—O—Si) therein, and a plurality of OH groups is present on the surface thereof.

In the silica sol composition of the present invention, for the size of the silica, it is possible to use silica particles having a particle average diameter (D50) of 5 nm to 10 µm, preferably 50 nm to 5 µm, and more preferably 0.5 µm to 1 µm based on silica primary particles in the form of powder which is dry without being aggregated. When the average diameter of silica primary particles is less than 5 nm, there is a problem in that it is difficult to uniformly disperse the particles due to the adsorption between the particles, and when the average diameter is 10 µm or more, there is a problem in that the defect rate of a final circuit material product is increased.

In the silica sol composition of the present invention, the silica may be included in an amount of 50 to 90 wt %, preferably 60 to 80 wt % based on the total content of the composition. When the content of the silica is less than 50 wt %, there is a problem in that the circuit material has a high coefficient of thermal expansion, and as a result, the warpage phenomenon of the circuit substrate occurs to increase the defect rate of the integrated circuit, and when the content is more than 90 wt %, due to the low content of the compounded resin which is an underfill composition, it is difficult to uniformly mix the silica filler with the compounded resin, and as a result, there is a problem with physical properties such as flexibility of the circuit substrate.

In the silica sol composition of the present invention, the anionic dispersant is not particularly limited as long as the anionic dispersant has an acid functional group such as phosphoric acid, sulfuric acid, or carboxylic acid, or a salt thereof, but preferably, it is possible to use an anionic dispersant having an acid functional group which is phosphoric acid or phosphate. As specific examples of the anionic dispersant, it is possible to use one or more selected from the group consisting of BYK-W903, BYK-W9010, BYK 110, BYK 180, and the like as an anionic dispersant having a phosphoric acid functional group, it is possible to use one or more selected from the group consisting of EU-DO113 or EU-DO113L, and the like as an anionic dispersant having a sulfuric acid functional group, and it is possible to use one or more selected from the group consisting of TEGO 757 W, TEGO 755 W, TEGO 610, and the like as an anionic dispersant having a carboxylic acid functional group.

In the silica sol composition of the present invention, it is preferred that the anionic dispersant is included in an amount of 0.01 to 5 wt %, preferably 0.1 to 2 wt % based on the total content of the composition. When the content of the anionic dispersant is less than 0.01 wt %, there is a problem in that it is difficult to uniformly disperse the silica filler in the organic solvent and it is difficult to achieve a uniform surface modification, and when the content is more than 5 wt %, there is a problem in that the anionic dispersant acts as an impurity which changes the curing temperature of the underfill composition and changes thermal characteristics of the circuit material.

In the silica sol composition of the present invention, as the two or more epoxy silane coupling agents, a silane coupling agent including an epoxy group is used, and preferably, it is possible to use two or more selected from the group consisting of 3-((glycidyloxy)propyl)trimethoxysilane, 3-(glycidyloxy)propyltriethoxysilane, 2-(3,4-epoxycyclohexyl)ethyltrimethoxysilane, 2-(3,4-epoxycyclohexyl) ethyltriethoxysilane, and epoxypropoxypropyl trimethoxysilane.

In particular, in the silica sol composition of the present invention, two or more epoxy silane coupling agents including an epoxy silane coupling agent having excellent dispersibility in a hydrophobic resin and an epoxy silane coupling agent having excellent dispersibility in a silica slurry are used. Specifically, as the epoxy silane coupling agent having excellent dispersibility in the hydrophobic resin, it is possible to use one or more selected from the group consisting of 2-(3,4-epoxycycicohexyl)ethyltrimethoxysilane, 2-(3,4-epoxycyclohexyl)ethyltriethoxysilane, and epoxypropoxypropyl trimethoxysilane, and as the epoxy silane coupling agent having excellent dispersibility in the silica slurry, it is possible to use one or more selected from the group consisting of 3-((glycidyloxy)propyl) trimethoxysilane and 3-(glycidyloxy)propyltriethoxysilane.

In the silica sol composition of the present invention, it is preferred that the epoxy silane coupling agent is included in an amount of 0.05 to 5 wt %, preferably 0.1 to 3 wt % based on the total content of the composition. When the content of the epoxy silane coupling agent is less than 0.05 wt %, there is a problem in that a silica surface modification has not been sufficiently made, and as a result, a large amount of residual silanol groups on the surface of silica remain and the solvent compatibility deteriorates due to a silica filler which is not organified, and when the content is more than 5 wt %, there is a problem in that by the residual silane coupling agent in the solvent after the silica surface modification, the epoxy silane coupling agent changes the curing temperature or acts as an impurity in a final product during the curing of an underfill composition in which the residual silane coupling agent is introduced into the silica filler.

In the silica sol composition of the present invention, the organic solvent may use an aprotic polar organic solvent or a mixed solvent of an aprotic polar organic solvent and a protic polar organic solvent. At this time, it is preferred that for the mixed solvent, the protic polar organic solvent is included in an amount of 10 wt % or less based on the total content of the mixed solvent.

In the silica sol composition of the present invention, the aprotic polar organic solvent is not particularly limited as long as the aprotic polar organic solvent exhibits aprotic polarity, but preferably, it is possible to use one or more selected from the group consisting of DMF, MEK, THF, and MIBK.

In the silica sol composition of the present invention, the protic polar organic solvent is not particularly limited as long as the protic polar organic solvent exhibits protic polarity, but preferably, it is possible to use one or more selected from the group consisting of MeOH, EtOH, IPA, and butanol.

The silica sol composition of the present invention has the composition as described above, and thus has a low viscosity of 1 to 100 mPa*s, preferably 10 to 50 mPa*s, and more preferably 10 to 30 mPa*s.

The present invention, in order to prepare the silica sol composition as described above, provides a method for preparing a surface-modified silica sol composition, the method comprising: (a) dissolving an anionic dispersant in an organic solvent, and then adding silica thereto to prepare a silica dispersion; (b) adding a first epoxy silane coupling agent to the silica dispersion to which the anionic dispersant is added to modify a surface thereof; and (c) further introducing a second epoxy silane coupling agent into the surface-modified silica dispersion in Step (b) to modify a surface of silica. A schematic view of the method for preparing a surface-modified silica sol composition is illustrated in FIG. 1.

First, in Step (a) of the method for preparing a surface-modified silica sol composition of the present invention, an anionic dispersant is dissolved in an organic solvent, and then silica is added thereto to prepare a silica dispersion.

In the method for preparing a surface-modified silica sol composition of the present invention, an anionic dispersant may be used to further improve dispersibility of silica particles in the organic solvent including silica and induce a uniform dispersion state. Through the dispersion state, when an epoxy silane coupling agent is introduced in Step (b) to be described below, a more uniform surface modification may be made.

The silica means $SiO_2$, and a silica generally used in the art may be used without particular limitation. The silica is in the form of powder, and in this case, silicon atoms and an oxygen atom form a siloxane bond (Si—O—Si) therein, and a plurality of OH groups is present on the surface thereof.

Further, for the size of the silica, it is possible to use silica particles having an average diameter (D50) of 5 nm to 10 μm, preferably 50 nm to 5 μm, and more preferably 0.5 μm to 1 μm based on silica primary particles in the form of powder which is dry without being aggregated. When the average diameter of silica primary particles is less than 5 nm, it is difficult to uniformly disperse the particles due to the adsorption between the particles, and when the average diameter is 10 μm or more, there is a problem in that the defect rate of a final circuit material product is increased.

In the method for preparing a surface-modified silica sol composition according to the present invention, the silica may be included in an amount of 50 to 90 wt %, preferably 60 to 80 wt % based on the total content of the composition. When the content of the silica is less than 50 wt %, there is a problem in that the circuit material has a high coefficient of thermal expansion, and as a result, the warpage phenomenon of the circuit substrate occurs to increase the defect rate of the integrated circuit, and when the content is more than 90 wt %, due to the low content of the compounded resin which is an underfill composition, it is difficult to uniformly mix the silica filler with the compounded resin, and as a result, there is a problem with physical properties such as flexibility of the circuit substrate.

The anionic dispersant is not particularly limited as long as the anionic dispersant has an acid functional group such as phosphoric acid, sulfuric acid, or carboxylic acid, or a salt thereof, but preferably, it is possible to use an anionic dispersant having an acid functional group which is phosphoric acid or phosphate. As a specific example of the anionic dispersant, it is possible to use one or more selected from the group consisting of BYK-W903, BYK-W9010, BYK 110, BYK 180, and the like as an anionic dispersant having a phosphoric acid functional group, it is possible to use one or more selected from the group consisting of EU-D0113 or EU-DO113L, and the like as an anionic dispersant having a sulfuric acid functional group, and it is possible to use one or more selected from the group consisting of TEGO 757 W, TEGO 755 W, TEGO 610, and the like as an anionic dispersant having a carboxylic acid functional group.

In addition, it is preferred that the anionic dispersant is included in an amount of 0.01 to 5 wt %, preferably 0.1 to 2 wt % based on the total content of the composition. When the content of the anionic dispersant is less than 0.01 wt %, there is a problem in that it is difficult to uniformly disperse the silica filler in the organic solvent and it is difficult to achieve a uniform surface modification, and when the content is more than 5 wt %, there is a problem in that the anionic dispersant acts as an impurity which changes the curing temperature of the underfill composition and changes thermal characteristics of the circuit material.

The organic solvent may use an aprotic polar organic solvent or a mixed solvent of an aprotic polar organic solvent and a protic polar organic solvent. At this time, it is preferred that for the mixed solvent, the protic polar organic solvent is included in an amount of 10 wt % or less based on the total content of the mixed solvent.

The aprotic polar organic solvent is not particularly limited as long as the aprotic polar organic solvent exhibits aprotic polarity, but preferably, it is possible to use one or more selected from the group consisting of DMF, MEK, THF, and MIBK.

The protic polar organic solvent is not particularly limited as long as the protic polar organic solvent exhibits protic polarity, but preferably, it is possible to use one or more selected from the group consisting of MeOH, EtOH, IPA, and butanol.

And then, in Step (b) of the method for preparing a surface-modified silica sol composition of the present invention, a first epoxy silane coupling agent is added to the silica dispersion to which the anionic dispersant is added to modify the surface.

In the method for preparing a surface-modified silica sol composition of the present invention, into a silica dispersion in which the dispersibility of silica particles in the organic solvent including silica is further improved by using an anionic dispersant, a first epoxy silane coupling agent may be introduced, thereby making a uniform surface modification of silica particles dispersed through a sol-gel reaction of silanol groups on the surface of silica with the silane coupling agent.

As the first epoxy silane coupling agent, an epoxy silane coupling agent having excellent dispersibility in a hydrophobic resin may be used, and preferably, it is possible to use one or more selected from the group consisting of 2-(3,4-epoxycyclohexyl)ethyltrimethoxysilane, 2-(3,4-epoxycyclohexyl)ethyltriethoxysiland, and epoxypropoxypropyl trimethoxysilane.

It is preferred that the first epoxy silane coupling agent is included in an amount of 0.03 to 5 wt %, preferably 0.05 to 3 wt % based on the total content of the composition. When the content of the first epoxy silane coupling agent is less than 0.03 wt %, there is a problem in that a silica surface modification has not been sufficiently made, and as a result, a large amount of residual silanol groups on the surface of silica remain and the solvent compatibility deteriorates due to a silica filler which is not organified, and when the content is more than 5 wt %, there is a problem in that by the residual silane coupling agent in the solvent after the silica surface modification, the first epoxy silane coupling agent changes the curing temperature or acts as an impurity in a final product during the curing of an underfill composition in which the residual silane coupling agent is introduced into the silica filler.

And then, in Step (c) of the method for preparing a surface-modified silica sol composition of the present invention, a second epoxy silane coupling agent is further introduced into the surface-modified silica dispersion to modify the surface of silica.

In Step (b), to the silica dispersion whose surface is modified with an epoxy group by the first epoxy silane coupling agent, a second epoxy silane coupling agent capable of improving dispersibility in a silica slurry is added, and consequently, the resin dispersion stability may be improved, and a low viscosity is maintained to maintain a low viscosity of a fully-blended varnish, which is a mixed solution before the curing of the underfill composition, and as a result, the dispersion stability may be improved to improve the process efficiency.

As the second epoxy silane coupling agent, an epoxy silane coupling agent having excellent dispersibility in a silica slurry may be used, and preferably, it is possible to use one or more selected from the group consisting of 3-(glycidyloxy)propyltrimethoxysilane and 3-(glycidyloxy)propyltriethoxysilane.

It is preferred that the second epoxy silane coupling agent is included in an amount of 0.03 to 5 wt %, preferably 0.05 to 3 wt % based on the total content of the composition. When the content of the second epoxy silane coupling agent is less than 0.03 wt %, there is a problem in that a silica surface modification has not been sufficiently made, and as a result, a large amount of residual silanol groups on the surface of silica remain and the solvent compatibility deteriorates due to a silica filler which is not organified, and when the content is more than 5 wt %, there is a problem in that by the residual silane coupling agent after the silica surface modification, the second epoxy silane coupling agent changes the curing temperature or acts as an impurity in a final product during the curing of an underfill composition in which the residual silane coupling agent is introduced into the silica filler.

In addition, the present invention provides a varnish composition including the surface-modified silica sol composition and a cyanate resin.

In the present invention, it is possible to use one or more selected from the group consisting of Primaset™ BA3000S, DT7000, LECY, PT15, PT30S, PT60S, PTC60S, and PTC2500 as the cyanate resin.

Since the varnish composition includes the silica sol composition of the present invention, the compatibility between an epoxy group which is a silica surface treatment agent and the cyanate resin is high, and as a result, the viscosity may be maintained at a low level.

The varnish composition of the present invention has the composition as described above, and thus has a low viscosity of 1 to 500 mPa*s, preferably 1 to 150 mPa*s, and more preferably 1 to 100 mPa*s.

Hereinafter, preferred examples will be provided to help understanding of the present invention, but the following Examples are only provided to illustrate the present invention, and it will be apparent to those skilled in the art that various alterations and modifications are possible within the scope and technical spirit of the present invention, and it is natural that such alterations and modifications also fall within the accompanying claims.

MODE FOR INVENTION

Preparation of Silica Sol Dispersion and Epoxy Surface-Modified Silica Sol

Example 1

(1) Preparation of Silica Sol Pre-Dispersion 1.05 g of an anionic dispersant BYK-W9010 from BYK Chemie was dissolved in 400 g of dimethylformamide (DMF), then 600 g of SFP-30M silica (average particle diameter (D50) is 0.7 μm) from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 2-(3,4-epoxycyclohexyl)ethyltrimethoxysilane (ETMS) was introduced into the silica pre-dispersion in Example 1-(1), 1.1 kg of 3-mm $ZrO_2$ beads were introduced thereto, then a surface modification was made at 260 rpm for 20 hours by using a ball mill, and then 4.9 g of 3-((glycidyloxy)propyl)trimethoxysilane (GPTMS) was introduced thereinto and the surface modification was additionally made for 2 hours by using the ball mill to prepare a 60 wt % epoxy surface-modified silica sol.

Example 2

(1) Preparation of Silica Sol Pre-Dispersion 1.05 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 2-(3,4-epoxycyclohexyl)ethyltrimethoxysilane (ETMS) and 4.9 g of 3-((glycidyloxy)propyl)trimethoxysilane (GPTMS) were introduced into the silica pre-dispersion in Example 2-(1), 1.1 kg of 3-mm $ZrO_2$ beads were introduced thereto, then a surface modification was made at 260 rpm for 22 hours by using a ball mill to prepare a 60 wt % epoxy surface-modified silica sol.

Example 3

(1) Preparation of Silica Sol Pre-Dispersion 2.1 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 2-(3,4-epoxycyclohexyl)ethyltrimethoxysilane (ETMS) was introduced into the silica pre-dispersion in Example 3-(1), 1.1 kg of 3-mm $ZrO_2$ beads were introduced thereto, then a surface modification was made at 260 rpm for 20 hours by using a ball mill, and then 4.9 g of 3-((glycidyloxy)propyl)trimethoxysilane (GPTMS) was introduced thereinto and the surface modification was additionally made for 2 hours by using the ball mill to prepare a 60 wt % epoxy surface-modified silica sol.

Example 4

(1) Preparation of Silica Sol Pre-Dispersion 1.05 g of an anionic dispersant BYK-W9010 from BYK Chemie was dissolved in 250 g of dimethylformamide (DMF), then 750 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 10 g of an epoxy silane coupling agent 2-(3,4-epoxycyclohexyl)ethyltrimethoxysilane (ETMS) was introduced into the silica pre-dispersion in Example 4-(1), 1.1 kg of 3-mm $ZrO_2$ beads were introduced thereto, then a surface modification was made at 260 rpm for 20 hours by using a ball mill, and then 5 g of 3-((glycidyloxy)propyl)trimethoxysilane (GPTMS) was introduced thereinto and the surface modification was additionally made for 2 hours by using the ball mill to prepare a 75 wt % epoxy surface-modified silica sol.

Example 5

(1) Preparation of Silica Sol Pre-Dispersion 1.05 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 10 g of an epoxy silane coupling agent 2-(3,4-epoxycyclohexyl)ethyltrimethoxysilane (ETMS) was introduced into the silica pre-dispersion in Example 5-(1), 1.1 kg of 3-mm $ZrO_2$ beads were introduced thereto, then a surface modification was made at 260 rpm for 20 hours by using a ball mill, and then 1 g of 3-((glycidyloxy)propyl)trimethoxysilane (GPTMS) was introduced thereinto and the surface modification was additionally made for 2 hours by using the ball mill to prepare a 60 wt % epoxy surface-modified silica sol.

Example 6

(1) Preparation of Silica Sol Pre-Dispersion 1.05 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5 g of an epoxy silane coupling agent 2-(3,4-epoxycyclohexyl)ethyltrimethoxysilane (ETMS) was introduced into the silica pre-dispersion in Example 6-(1), 1.1 kg of 3-mm $ZrO_2$ beads were introduced thereto, then a surface modification was made at 260 rpm for 20 hours by using a ball mill, and then 10 g of 3-((glycidyloxy)propyl)trimethoxysilane (GPTMS) was introduced thereinto and the surface modification was additionally made for 2 hours by using the ball mill to prepare a 60 wt % epoxy surface-modified silica sol.

Example 7

(1) Preparation of Silica Sol Pre-Dispersion 1.05 g of an anionic dispersant BYK-W9010 from BYK Chemie was dissolved in 300 g of dimethylformamide (DMF), then 700 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5 g of an epoxy silane coupling agent 2-(3,4-epoxycyclohexyl)ethyltrimethoxysilane (ETMS) was introduced into the silica pre-dispersion in Example 7-(1), 1.1 kg of 3-mm $ZrO_2$ beads were introduced thereto, then a surface modification was made at 2,000 rpm for 20 hours by using a beads mill, and then 10 g of 3-((glycidyloxy)propyl)trimethoxysilane (GPTMS) was introduced thereinto and the surface modification was additionally made for 2 hours by using a ball mill to prepare a 70 wt % epoxy surface-modified silica sol.

Example 8

(1) Preparation of Silica Sol Pre-Dispersion 4.2 g of an anionic dispersant BYK-W9010 from BYK Chemie was dissolved in 300 g of dimethylformamide (DMF), then 700 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 10 g of an epoxy silane coupling agent 2-(3,4-epoxycyclohexyl)ethyltrimethoxysilane (ETMS) was introduced into the silica pre-dispersion in Example 8-(1), 1.1 kg of 3-mm $ZrO_2$ beads were introduced thereto, then a surface modification was made at 2,000 rpm for 20 hours by using a beads mill, and then 10 g of 3-((glycidyloxy)propyl)trimethoxysilane (GPTMS) was introduced thereinto and the surface modification was additionally made for 2 hours by using a ball mill to prepare a 70 wt % epoxy surface-modified silica sol.

Example 9

(1) Preparation of Silica Sol Pre-Dispersion 4.2 g of an anionic dispersant BYK-W9010 from BYK Chemie was dissolved in 250 g of dimethylformamide (DMF), then 750 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 10 g of an epoxy silane coupling agent 2-(3,4-epoxycyclohexyl)ethyltrimethoxysilane (ETMS) was introduced into the silica pre-dispersion in Example 9-(1), 1.1 kg of 3-mm $ZrO_2$ beads were introduced thereto, then a surface modification was made at 2,000 rpm for 20 hours by using a beads mill, and then 10 g of 3-((glycidyloxy)propyl)trimethoxysilane (GPTMS) was introduced thereinto and the surface modification was additionally made for 2 hours by using a ball mill to prepare a 75 wt % epoxy surface-modified silica sol.

Example 10

(1) Preparation of Silica Sol Pre-Dispersion 0.5 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5 g of an epoxy silane coupling agent 2-(3,4-epoxycyclohexyl)ethyltrimethoxysilane (ETMS) was introduced into the silica pre-dispersion in Example 10-(1), 1.1 kg of 3-mm $ZrO_2$ beads were introduced thereto, then a surface modification was made at 2,000 rpm for 20 hours by using a beads mill, and then 5 g of 3-((glycidyloxy)propyl)trimethoxysilane (GPTMS) was introduced thereinto and the surface modification was additionally made for 2 hours by using a ball mill to prepare a 70 wt % epoxy surface-modified silica sol.

Example 11

(1) Preparation of Silica Sol Pre-Dispersion 1.05 g of an anionic dispersant BYK-W9010 from BYK Chemie was dissolved in 300 g of dimethylformamide (DMF), then 700 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 8 g of an epoxy silane coupling agent 2-(3,4-epoxycyclohexyl)ethyltrimethoxysilane (ETMS) was introduced into the silica pre-dispersion in Example 11-(1), 1.1 kg of 3-mm $ZrO_2$ beads were introduced thereto, then a surface modification was made at 2,000 rpm for 20 hours by using a beads mill, and then 4 g of 3-((glycidyloxy)propyl)trimethoxysilane (GPTMS) was introduced thereinto and the surface modification was additionally made for 2 hours by using a ball mill to prepare a 70 wt % epoxy surface-modified silica sol.

Example 12

(1) Preparation of Silica Sol Pre-Dispersion 1.05 g of an anionic dispersant BYK-W903 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 2-(3,4-epoxycyclohexyl)ethyltrimethoxysilane (ETMS) was introduced into the silica pre-dispersion in Example 12-(1), 1.1 kg of 3-mm $ZrO_2$ beads were introduced thereto, then a surface modification was made at 260 rpm for 20 hours by using a ball mill, and then 4.9 g of 3-((glycidyloxy)propyl)trimethoxysilane (GPTMS) was introduced thereinto and the surface modification was additionally made for 2 hours by using the ball mill to prepare a 60 wt % epoxy surface-modified silica sol.

Example 13

(1) Preparation of Silica Sol Pre-Dispersion 1.05 g of an anionic dispersant BYK-W903 from BYK Chemie was dissolved in 300 g of dimethylformamide (DMF), then 700 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 2-(3,4-epoxycyclohexyl)ethyltrimethoxysilane (ETMS) was introduced into the silica pre-dispersion in Example 13-(1), 1.1 kg of 3-mm $ZrO_2$ beads were introduced thereto, then a surface modification was made at 260 rpm for 20 hours by using a ball mill, and then 4.9 g of 3-((glycidyloxy)propyl)trimethoxysilane (GPTMS) was introduced thereinto and the surface modification was additionally made for 2 hours by using the ball mill to prepare a 70 wt % epoxy surface-modified silica sol.

Example 14

(1) Preparation of Silica Sol Pre-Dispersion 2.0 g of an anionic dispersant BYK-W903 from BYK Chemie was dissolved in 300 g of dimethylformamide (DMF), then 700 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 10 g of an epoxy silane coupling agent 2-(3,4-epoxycyclohexyl)ethyltrimethoxysilane (ETMS) was introduced into the silica pre-dispersion in Example 14-(1), 1.1 kg of 3-mm $ZrO_2$ beads were introduced thereto, then a surface modification was made at 260 rpm for 20 hours by using a ball mill, and then 10 g of 3-((glycidyloxy)propyl)trimethoxysilane (GPTMS) was introduced thereinto and the surface modification was additionally made for 2 hours by using the ball mill to prepare a 70 wt % epoxy surface-modified silica sol.

Example 15

(1) Preparation of Silica Sol Pre-Dispersion 4 g of an anionic dispersant BYK-W903 from BYK Chemie was dissolved in 500 g of dimethylformamide (DMF), then 500 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5 g of an epoxy silane coupling agent 2-(3,4-epoxycyclohexyl)ethyltrimethoxysilane (ETMS) was introduced into the silica pre-dispersion in Example 15-(1), 1.1 kg of 3-mm $ZrO_2$ beads were introduced thereto, then a surface modification was made at 260 rpm for 20 hours by using a ball mill, and then 5 g of 3-((glycidyloxy)propyl)trimethoxysilane (GPTMS) was introduced thereinto and the surface modification was additionally made for 2 hours by using the ball mill to prepare a 50 wt % epoxy surface-modified silica sol.

Example 16

(1) Preparation of Silica Sol Pre-Dispersion 1.05 g of an anionic dispersant BYK-W9010 from BYK Chemie was dissolved in 300 g of dimethylformamide (DMF), then 700 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 2 g of an epoxy silane coupling agent 2-(3,4-epoxycyclohexyl)ethyltrimethoxysilane (ETMS) was introduced into the silica pre-dispersion in Example 12-(1), 1.1 kg of 3-mm $ZrO_2$ beads were introduced thereto, then a surface modification was made at 260 rpm for 20 hours by using a ball mill, and then 8 g of 3-((glycidyloxy)propyl)trimethoxysilane (GPTMS) was introduced thereinto and the surface modification was additionally made for 2 hours by using the ball mill to prepare a 70 wt % epoxy surface-modified silica sol.

Example 17

(1) Preparation of Silica Sol Pre-Dispersion 0.7 g of BYK-W9010 from BYK Chemie, which is an anionic dispersant and 0.7 g of BYK-163 were dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 2-(3,4-epoxycyclohexyl)ethyltrimethoxysilane (ETMS) was introduced into the silica pre-dispersion in Example 17-(1), 1-mm $ZrO_2$ beads were introduced thereto, then a surface modification was made at 1,000 rpm for 2 hours by using a beads mill, and then 4.9 g of 3-((glycidyloxy)propyl)trimethoxysilane (GPTMS) was introduced thereinto and the surface modification was additionally made for 10 minutes by using a beads mill to prepare a 60 wt % epoxy surface-modified silica sol.

Comparative Example 1

(1) Preparation of Silica Sol Pre-Dispersion 600 g of SFP-30M silica from Denka Co., Ltd. was introduced into 400 g of dimethylformamide (DMF) while being stirred, and then the resulting mixture was dispersed for 30 minutes to obtain a pre-dispersion.

(2) Preparation of Epoxy Surface-Modified Silica Sol 10.5 g of an epoxy silane coupling agent 3-((glycidyloxy)propyl)trimethoxysilane (GPTMS) was introduced into the silica pre-dispersion in Comparative Example 1-(1), 1-mm $ZrO_2$ beads were introduced thereto, then a surface modification was made at 260 rpm for 20 hours by using a ball mill to prepare a 60 wt % epoxy surface-modified silica sol.

Comparative Example 2

(1) Preparation of Silica Sol Pre-Dispersion 1.05 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 10.5 g of an epoxy silane coupling agent 2-(3,4-epoxycyclohexyl)ethyltrimethoxysilane (ETMS) was introduced into the silica pre-dispersion in Comparative Example 2-(1), 1.1 kg of 3-mm $ZrO_2$ beads were introduced thereto, then a surface modification was made at 260 rpm for 20 hours by using a ball mill to prepare a 60 wt % epoxy surface-modified silica sol.

Comparative Example 3

(1) Preparation of Silica Sol Pre-Dispersion 1.05 g of an anionic dispersant BYK-W9010 from BYK Chemie was dissolved in 400 g of dimethylformamide (DMF), then 600 g of SFP-30M silica from Denka Co., Ltd. was introduced thereinto while being slowly stirred, and then the resulting mixture was dispersed for 30 minutes to obtain a silica pre-dispersion.

(2) Preparation of Epoxy Surface-Modified Silica Sol 5.6 g of an epoxy silane coupling agent 3-((glycidyloxy)propyl)trimethoxysilane (GPTMS) was introduced into the silica pre-dispersion in Example 3-(1), 1.1 kg of 3-mm $ZrO_2$ beads were introduced thereto, then a surface modification was made at 260 rpm for 20 hours by using a ball mill, and then 4.9 g of 2-(3,4-epoxycyclohexyl)ethyltrimethoxysilane (ETMS) was introduced thereinto and the surface modification was additionally made for 2 hours by using the ball mill to prepare a 60 wt % epoxy surface-modified silica sol.

Experimental Examples

Experimental Example 1: Confirmation of Modification State of Surface of Silica

The modification state of the surface of silica in the epoxy surface-modified silica sol prepared in Example 1 was confirmed. The surface modification of silica was confirmed at a scan speed of 25 Hz by using a photoacoustic FT-IR (FTS7000), and the result is illustrated in FIG. 2.

Figure 2:
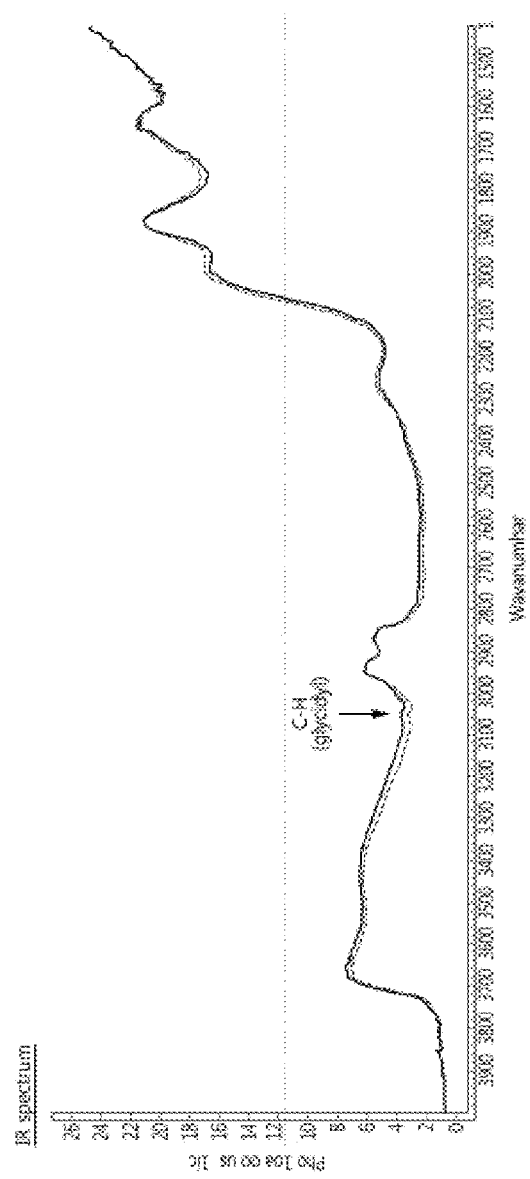
FIG. 2 is a FT-IR graph which measures the surface modification degree of silica prepared according to examples of the present invention.

As illustrated in FIG. 2, an epoxy functional group (glycidyl group) was observed near 3,050 $CM^{-1}$, and through this, it could be confirmed that the surface of silica was surface-modified with an epoxy group.

Experimental Example 2: Measurement of Viscosity of Mixture of Surface-Modified Silica Sol and Cyanate Resin The viscosities of the epoxy surface-modified silica sols prepared in Examples 1 to 3 and Comparative Examples 1 to 3 and the viscosities of the mixtures of the silica sols and cyanate resins (BA3000S) were measured as described below, and are shown in Table 1.

(1) Measurement of Viscosity of Silica Sol

The viscosities of the epoxy surface-modified silica sols obtained in Examples 1 to 17 and Comparative Examples 1 to 3 were measured by using a viscometer from Toki Sangyo Co., Ltd. The viscosities were measured 5 times at 10 RPM and 50 RPM at a temperature of 20° C., and then the average value thereof was obtained. The BA3000S is one of the underfill compositions, and is a component which is judged to cause the biggest problem in the compatibility with the surface-modified silica additive.

(2) Measurement of Viscosity of Mixture of Silica Sol/Cyanate Resin 6 g of a cyanate resin (BA3000S) was mixed with 10 g of the 60 to 80 wt % epoxy surface-modified silica sols obtained in Examples 1 to 3 and Comparative Examples 1 to 3, and then the viscosities of the resulting mixtures were measure by using a viscometer from Toki Sangyo Co., Ltd. The viscosities were measured 5 times at 10 RPM and 50 RPM at a temperature of 20° C., and then the average value thereof was obtained.

TABLE 1

| | Viscosity of silica sol | | Initial viscosity at the time of mixing BA3000S | | Viscosity at 24 hours after mixing BA3000S | |
|---|---|---|---|---|---|---|
| | 10 rpm | 50 rpm | 10 rpm | 50 rpm | 10 rpm | 50 rpm |
| Example 1 | 19.5 | 18.4 | 35.2 | 34.3 | 50.4 | 48.5 |
| Example 2 | 20.2 | 19.5 | 110.2 | 108.4 | 145.6 | 144.7 |
| Example 3 | 19.6 | 18.5 | 25.6 | 24.3 | 40.5 | 39.6 |
| Example 4 | 62.5 | 60.5 | 122.1 | 121.3 | 165.2 | 162.5 |
| Example 5 | 19.6 | 18.7 | 25.1 | 24.3 | 30.2 | 28.5 |
| Example 6 | 20.4 | 18.5 | 26.3 | 25.1 | 34.1 | 33.1 |
| Example 7 | 25.6 | 24.1 | 31.1 | 30.2 | 36.1 | 35.2 |
| Example 8 | 24.3 | 22.3 | 28.6 | 26.7 | 36.7 | 34.6 |
| Example 9 | 40.3 | 39.5 | 102.5 | 101.1 | 170.1 | 168.1 |
| Example 10 | 18.9 | 17.5 | 24.3 | 23.5 | 34.5 | 33.5 |
| Example 11 | 25.4 | 24.3 | 30.2 | 30.1 | 38.4 | 37.4 |
| Example 12 | 35.1 | 33.2 | 35.3 | 34.2 | 50.4 | 48.3 |
| Example 13 | 45.3 | 42.3 | 45.7 | 47.3 | 54.1 | 53.1 |
| Example 14 | 40.1 | 38.3 | 42.3 | 41.3 | 56.4 | 54.3 |
| Example 15 | 38.6 | 37.6 | 38.5 | 37.6 | 54.1 | 52.9 |
| Example 16 | 20.4 | 20.3 | 24.8 | 23.4 | 30.2 | 28.7 |
| Example 17 | 18.2 | 16.3 | 30.5 | 29.6 | 35.2 | 34.5 |
| Comparative Example 1 | 144.4 | 51.30 | >3000 | >3000 | >3000 | >3000 |
| Comparative Example 2 | 50.2 | 40.3 | 62.3 | 59.3 | 75.3 | 72.3 |
| Comparative Example 3 | 48.8 | 33.31 | 402.0 | 250.2 | >3000 | >3000 |

As shown in Table 1, it could be seen that the inherent viscosities of the epoxy surface-modified silica sols prepared in Examples 1 to 17 of the present invention and the viscosities of the mixture of the silica sol with the cyanate resin are much lower than those in Comparative Examples 1 to 3.

Further, when Example 1 is compared with Comparative Example 3, it could be seen that Example 1 in which an epoxy silane coupling agent having excellent dispersibility was introduced into a hydrophobic resin to modify the surface, and then an epoxy silane coupling agent having excellent dispersibility was introduced into a silica slurry to again modify the surface had a much lower viscosity than Comparative Example 3 in which the introduction sequence was reversed.

Therefore, it could be confirmed that the compatibility between the silica sol whose surface was modified with an epoxy group according to the present invention and the cyanate resin had been effectively enhanced.

The invention claimed is:

1. A silica sol composition comprising silica, an anionic dispersant, two or more epoxy silane coupling agents, and an organic solvent,
wherein said epoxy silane coupling agents are each included in an amount of 0.03 to 3 wt % based on the total content of the composition.

2. The silica sol composition of claim 1, wherein primary particles of the silica have an average diameter of 5 nm to 10 μm.

3. The silica sol composition of claim 1, wherein the silica is comprised in an amount of 50 to 90 wt % based on a total content of the composition.

4. The silica sol composition of claim 1, wherein the anionic dispersant has an acid functional group which is phosphoric acid, sulfuric acid, or carboxylic acid, or a salt thereof.

5. The silica sol composition of claim 1, wherein the anionic dispersant has an acid functional group which is phosphoric acid or phosphate.

6. The silica sol composition of claim 1, wherein the anionic dispersant is comprised in an amount of 0.01 to 5 wt % based on a total content of the composition.

7. The silica sol composition of claim 1, wherein the organic solvent is an aprotic polar organic solvent.

8. The silica sol composition of claim 1, wherein the organic solvent is a mixed solvent of an aprotic polar organic solvent and a protic polar organic solvent, and the protic polar organic solvent is comprised in an amount of 10 wt % or less based on a total content of the mixed solvent.

9. The silica sol composition of claim 7, wherein the aprotic polar organic solvent is one or more selected from the group consisting of DMF, MEK, THF, and MIBK.

10. The silica sol composition of claim 8, wherein the aprotic polar organic solvent is one or more selected from the group consisting of DMF, MEK, THF, and MIBK, and the protic polar organic solvent is one or more selected from the group consisting of MeOH, EtOH, IPA, and butanol.

11. The silica sol composition of claim 1, wherein the two or more epoxy silane coupling agents are two or more selected from the group consisting of 3-((glycidyloxy)propyl)trimethoxysilane, 3-(glycidyloxy)propyltriethoxysilane, 2-(3,4-epoxycyclohexyl)ethyltrimethoxysilane, 2-(3,4-epoxycyclohexyl)ethyltriethoxysilane, and epoxypropoxypropyl trimethoxysilane.

12. The silica sol composition of claim 1, wherein at least one of the two or more epoxy silane coupling agents is an epoxy silane coupling agent having uniform dispersibility in a hydrophobic resin.

13. The silica sol composition of claim 1, wherein at least one of the two or more epoxy silane coupling agents is an epoxy silane coupling agent having uniform dispersibility in a silica slurry.

14. The silica sol composition of claim 12, wherein the epoxy silane coupling agent is one or more selected from the group consisting of 2-(3,4-epoxycyclohexyl)ethyltrimethoxysilane, 2-(3,4-epoxycyclohexyl)ethyltriethoxysilane, and epoxypropoxypropyl trimethoxysilane.

15. The silica sol composition of claim 13, wherein the epoxy silane coupling agent is one or more selected from the group consisting of 3-(glycidyloxy)propyltrimethoxysilane and 3-(glycidyloxy)propyltriethoxysilane.

16. The silica sol composition of claim 1, wherein the silica sol composition has a viscosity of 1 to 100 mPa*s.

17. A method for preparing a surface-modified silica sol composition, the method comprising:
(a) dissolving an anionic dispersant in an organic solvent, and then adding silica thereto to prepare a silica dispersion;
(b) adding a first epoxy silane coupling agent to the silica dispersion to which the anionic dispersant is added to modify a surface thereof; and
(c) further introducing a second epoxy silane coupling agent into the surface-modified silica dispersion in Step (b) to modify a surface of silica,
wherein said epoxy silane coupling agents are each included in an amount of 0.03 to 3 wt % based on the total content of the composition.

18. A varnish composition comprising a silica sol composition and a cyanate resin, wherein the silica sol composition comprises silica, an anionic dispersant, two or more epoxy silane coupling agents, and an organic solvent.

19. The varnish composition of claim 18, wherein the varnish composition has a viscosity of 1 to 100 mPa*s.

20. The silica sol composition of claim 1, wherein the silica sol composition has a viscosity of 10 to 50 mPa*s.

* * * * *